US009830912B2

(12) United States Patent
Rao (10) Patent No.: US 9,830,912 B2
(45) Date of Patent: Nov. 28, 2017

(54) SPEAK AND TOUCH AUTO CORRECTION INTERFACE

(71) Applicant: Ashwin P Rao, Kirkland, WA (US)

(72) Inventor: Ashwin P Rao, Kirkland, WA (US)

( * ) Notice: Subject to any disclaimer, the term of this patent is extended or adjusted under 35 U.S.C. 154(b) by 18 days.

(21) Appl. No.: 13/844,490

(22) Filed: Mar. 15, 2013

(65) Prior Publication Data

US 2013/0289993 A1 Oct. 31, 2013

Related U.S. Application Data

(63) Continuation-in-part of application No. 12/578,355, filed on Oct. 13, 2009, now Pat. No. 8,571,862, which is a continuation-in-part of application No. 11/948,757, filed on Nov. 30, 2007, now Pat. No. 8,355,915.

(60) Provisional application No. 61/196,037, filed on Oct. 14, 2008, provisional application No. 60/872,467, filed on Nov. 30, 2006, provisional application No. 60/999,593, filed on Oct. 19, 2007.

(51) Int. Cl.
*G10L 15/32* (2013.01)
*G10L 15/24* (2013.01)
*G06F 17/27* (2006.01)
*G10L 15/22* (2006.01)
*G10L 15/18* (2013.01)
*G06F 3/023* (2006.01)

(52) U.S. Cl.
CPC .............. *G10L 15/32* (2013.01); *G06F 3/023* (2013.01); *G06F 3/0237* (2013.01); *G06F 17/276* (2013.01); *G10L 15/22* (2013.01); *G10L 15/24* (2013.01); *G06F 3/0233* (2013.01); *G06F 3/0235* (2013.01); *G10L 15/1815* (2013.01)

(58) Field of Classification Search
CPC ... G10L 15/22; G10L 15/1815; G06F 3/0233; G06F 3/0235
USPC .................................................. 704/E15.04
See application file for complete search history.

(56) References Cited

U.S. PATENT DOCUMENTS

| 4,256,924 | A | 3/1981 | Sakoe |
|---|---|---|---|
| 4,805,219 | A | 2/1989 | Baker et al. |
| 4,897,878 | A | 1/1990 | Bell et al. |
| 4,914,704 | A | 4/1990 | Cole |
| 5,027,406 | A | 6/1991 | Roberts et al. |
| 5,210,689 | A | 5/1993 | Baker et al. |
| 5,231,670 | A | 7/1993 | Goldhor et al. |
| 5,293,452 | A | 3/1994 | Picone et al. |
| 5,444,768 | A | 8/1995 | Lemaire et al. |
| 5,526,463 | A | 6/1996 | Gillick et al. |

(Continued)

FOREIGN PATENT DOCUMENTS

WO WO9916051 4/1999
WO WO0146649 6/2001

*Primary Examiner* — Pierre-Louis Desir
*Assistant Examiner* — Forrest F Tzeng (57) ABSTRACT

The disclosure describes an overall system/method for developing a "speak and touch auto correction interface" referred to as STACI which is far more superior to existing user interfaces including the widely adopted qwerty. Using STACI a user speaks and types a word at the same time. The redundant information from the two modes, namely speech and the letters typed, enables the user to sloppily and partially type the words. The result is a very fast and accurate enhanced keyboard interface enabling document production on computing devices like phones and tablets.

22 Claims, 4 Drawing Sheets

(56) References Cited

U.S. PATENT DOCUMENTS

| | | | |
|---|---|---|---|
| 5,583,961 | A | 12/1996 | Pawlewski et al. |
| 5,649,060 | A | 7/1997 | Ellozy et al. |
| 5,822,730 | A | 10/1998 | Roth et al. |
| 5,855,000 | A | 12/1998 | Waibel et al. |
| 5,917,890 | A | 6/1999 | Brotman et al. |
| 5,937,380 | A * | 8/1999 | Segan .................... G10L 15/22 704/235 |
| 5,952,942 | A * | 9/1999 | Balakrishnan ........ G06F 3/0237 341/20 |
| 5,956,683 | A | 9/1999 | Jacobs et al. |
| 5,970,448 | A | 10/1999 | Goldhor et al. |
| 5,991,720 | A | 11/1999 | Galler |
| 6,064,950 | A | 5/2000 | Young et al. |
| 6,064,957 | A | 5/2000 | Brandow et al. |
| 6,064,963 | A | 5/2000 | Gainsboro |
| 6,067,514 | A | 5/2000 | Chen |
| 6,178,396 | B1 | 1/2001 | Ushioda |
| 6,198,808 | B1 | 3/2001 | Martin |
| 6,223,150 | B1 | 4/2001 | Duan et al. |
| 6,304,844 | B1 | 10/2001 | Pan et al. |
| 6,321,196 | B1 | 11/2001 | Franceschi |
| 6,327,566 | B1 | 12/2001 | Vanbuskirk et al. |
| 6,401,065 | B1 | 6/2002 | Kanevsky et al. |
| 6,411,929 | B1 | 6/2002 | Ishiwatari et al. |
| 6,421,645 | B1 | 7/2002 | Beigi et al. |
| 6,496,799 | B1 | 12/2002 | Pickering |
| 6,567,755 | B1 | 5/2003 | Maali et al. |
| 6,601,027 | B1 | 7/2003 | Wright et al. |
| 6,629,071 | B1 | 9/2003 | Mann |
| 6,681,206 | B1 | 1/2004 | Gorin et al. |
| 6,694,296 | B1 | 2/2004 | Alleva et al. |
| 6,751,591 | B1 | 6/2004 | Gorin et al. |
| 6,868,383 | B1 | 3/2005 | Bangalore et al. |
| 6,879,956 | B1 | 4/2005 | Honda et al. |
| 6,904,405 | B2 | 6/2005 | Suominen |
| 6,912,498 | B2 | 6/2005 | Stevens et al. |
| 6,934,683 | B2 | 8/2005 | Ju et al. |
| 6,965,863 | B1 | 11/2005 | Zuberec et al. |
| 6,968,311 | B2 | 11/2005 | Knockeart et al. |
| 6,975,986 | B2 | 12/2005 | Hartley et al. |
| 7,003,457 | B2 | 2/2006 | Halonen et al. |
| 7,006,971 | B1 | 2/2006 | Stahl et al. |
| 7,069,215 | B1 | 6/2006 | Bangelore et al. |
| 7,085,720 | B1 | 8/2006 | Gorin et al. |
| 7,092,870 | B1 | 8/2006 | Chen et al. |
| 7,143,037 | B1 | 11/2006 | Chestnut |
| 7,149,970 | B1 | 12/2006 | Pratley et al. |
| 7,315,813 | B2 | 1/2008 | Kuo et al. |
| 7,505,908 | B2 | 3/2009 | Johnston et al. |
| 7,548,859 | B2 | 6/2009 | Thompson et al. |
| 7,634,409 | B2 | 12/2009 | Kennewick et al. |
| 7,720,682 | B2 * | 5/2010 | Stephanick ......... G06F 17/2735 704/252 |
| 7,908,142 | B2 | 3/2011 | Yamada |
| 7,966,188 | B2 | 6/2011 | Ativanichayaphong et al. |
| 8,355,915 | B2 | 1/2013 | Rao |
| 2002/0135618 | A1 | 9/2002 | Maes et al. |
| 2002/0138265 | A1 | 9/2002 | Stevens et al. |
| 2003/0112277 | A1 * | 6/2003 | Shteyn .................. G06F 3/0233 715/773 |
| 2004/0083109 | A1 | 4/2004 | Halonen et al. |
| 2004/0172258 | A1 | 9/2004 | Dominach et al. |
| 2004/0199385 | A1 | 10/2004 | Deligne et al. |
| 2005/0043947 | A1 | 2/2005 | Roth et al. |
| 2005/0049858 | A1 | 3/2005 | Busayapongchai |
| 2005/0253814 | A1 * | 11/2005 | Ghassabian .................... 345/168 |
| 2005/0283364 | A1 | 12/2005 | Longe et al. |
| 2006/0015336 | A1 | 1/2006 | Parthasarathy |
| 2006/0100879 | A1 | 5/2006 | Jakobsen et al. |
| 2006/0190256 | A1 * | 8/2006 | Stephanick et al. .......... 704/252 |
| 2007/0046645 | A1 | 3/2007 | Hirota et al. |
| 2007/0106507 | A1 | 5/2007 | Charoenruengkit et al. |
| 2007/0182595 | A1 * | 8/2007 | Ghasabian .................... 341/22 |
| 2007/0276651 | A1 | 11/2007 | Bliss et al. |
| 2008/0077406 | A1 * | 3/2008 | Ganong, III ............ G10L 15/22 704/251 |
| 2008/0212762 | A1 * | 9/2008 | Gray ...................... H04M 3/46 379/211.01 |
| 2009/0055174 | A1 | 2/2009 | Han et al. |
| 2009/0182550 | A1 | 7/2009 | Geri et al. |
| 2010/0312547 | A1 * | 12/2010 | Van Os .................... G06F 3/167 704/9 |
| 2012/0254744 | A1 * | 10/2012 | Kay ...................... G06F 3/0237 715/257 |
| 2016/0125883 | A1 * | 5/2016 | Koya .................... G10L 15/22 704/232 |

* cited by examiner

SPEAK AND TOUCH AUTO CORRECTION INTERFACE

CROSS-REFERENCE TO RELATED APPLICATIONS

This patent application is a continuation-in-part of U.S. application Ser. No. 12/578,355, filed Oct. 13, 2009, which claims priority to U.S. Provisional Patent Application No. 61/196,037, filed Oct. 14, 2008, and which is a continuation-in-part of U.S. application Ser. No. 11/948,757, filed Nov. 30, 2007, which claims priority to U.S. Provisional Patent Application No. 60/872,467, filed Nov. 30, 2006, and to U.S. Provisional Patent Application No. 60/999,593, filed Oct. 19, 2007, which are incorporated herein by reference in their entirety.

FIELD OF THE INVENTION

The invention relates to user interfaces for entering text into devices using a combination of text prediction and speech recognition.

BACKGROUND

The problem of entering text into computing devices (e.g., cellular phones, tablets, laptops, smart watches, smart glasses, and the like) is of specific importance in many fundamental applications including, but not limited to, document production (e.g., composing an email, writing a report or a note), text-messaging (e.g., SMS, MMS, IM, chats), and wireless internet browsing.

Current solutions that address the above mentioned problem may be broadly classified into two types: (a) text prediction and (b) speech to text. The solutions utilizing text prediction come in two different flavors. In one, word choices are predicted and displayed as soon as the user types the partial letters of the desired word; the first choice is normally the letters typed and is followed by several other choices for the user to select either by touching the choice displayed (on a touch device) or by pressing the space bar. An example of this form of text prediction is the well-known xt9® software, sold by Nuance Communications, Inc. of Burlington, Mass., that comes pre-built in several of current day phones. In the xt9® software, a user types the letters "aqe" and notices that the word "awesome" is listed as a choice within a list of 3 or more word choices. In the second form of text prediction, referred to as auto correction, a user simply types out the entire word and the auto correction based solution displays choices that it thinks are correct; the desired choice may be automatically inserted by touching it or using the space-bar. For example on some popular smart phones, a user types "aqesome" and sees the corrected word "awesome" being inserted upon pressing the space-bar. Although the basic concept of text prediction involves predicting words using partially or completely typed ambiguous letters, several enhancements exist based on using varied keyboard designs, using gesture based typing (e.g., swype), using handwriting recognition, and so on.

One of the primary drawbacks with text prediction is the seemingly awkward user interface; a user needs to type a couple of letters, then lift their head, scroll their eyes, or in some manner change their focus in order to check if the desired word is accurately displayed, before moving to the next word. Although the number of keys pressed is significantly reduced, the requirement to lift their head, scroll their eyes or otherwise change focus disturbs the user's flow in text composition, thus resulting in a fairly sub-optimal user experience. The problem could be solved if text prediction could be accurate enough to display only one word choice with nearly 100% accuracy. Unfortunately, even with the most sophisticated statistical n-gram models, it is almost impossible to accurately predict a word from the myriad of choices using only word statistics and context.

Text entry using speech-to-text is a whole different alternative wherein a user presses a "speak" button and speaks a phrase. The computing device then converts the user's speech to text and displays the transcription for further action by the user. There has been limited adoption of speech-to-text because of the technology's inherent lack of robustness and accuracy; primarily due to problems associated with large vocabulary sizes, varied accents, varied pronunciations, mismatched language models, background noise, channel noise, and the like.

Additionally, the user interface associated with speech-to-text is seemingly different from the widely adopted keyboard interface. Specifically, to use speech-to-text, a user has to think of a whole phrase in mind, then press a "speak" button, and subsequently speak it out loud in one go. This is well suited when a user is trying to access information via the internet, such as when using Siri® voice recognition software in the iPhone® mobile digital device manufactured by Apple Inc. Unfortunately this interface is not natural when it comes to composing long text documents. As a result, the market lacks mainstream adoption of speech-to-text except in hands-busy situations like driving a car or when used as an accessible technology by the handicapped and disabled.

Multimodal solutions which combine speech and typing have been proposed several times in literature. The inventors have determined that all the above described approaches, even though they have significant merits, they have failed to render the widely adopted "qwerty keyboard" obsolete. In fact, the qwerty keyboard continues to dominate as the most preferred input method.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following disclosure describes an auto correction interface that combines a user's speech and the user's touch in a multimodal fashion. The invention may be viewed from two different angles: (a) a speech recognition system whose accuracy is significantly increased by providing additional knowledge of the word to recognize in the form of the word's initial letters and (b) an auto correction system whose accuracy is significantly improved by providing additional knowledge of the word to correct in the form of the acoustics of the word spoken by the user. Specifically in this invention, a user speaks and types a word substantially at the same time. There is no restriction to the ordering of the spoken word and the letters typed; a user may first speak and then type the word or may speak while typing the word or may speak after typing the word; although it is most efficient and fast when a user speaks and types at the same time. On receiving the letters from the user, the system determines a set of letters based upon an ambiguity map. Using the set of letters as a filter and further aided by additional constraints including a multimodal language model, the system dynamically narrows the speech recognition search. When the user hits the space-bar key indicating end of word, the process uses the most recently reduced search to perform speech recognition and computes a best hypothesized word along with its NBest choice alternatives. The multimodal language model is used to post process the list of words to yield the best word, which is presented to the application; a confidence model's score may also accompany the word in the application to indicate its confidence to the user.

An embodiment of the "speak and touch auto correction interface" referred to as STACI is described. Next, three sub-components of STACI, namely the method to dynamically reduce the search, the multimodal language model, and the multimodal confidence model are described.

Figure 1:
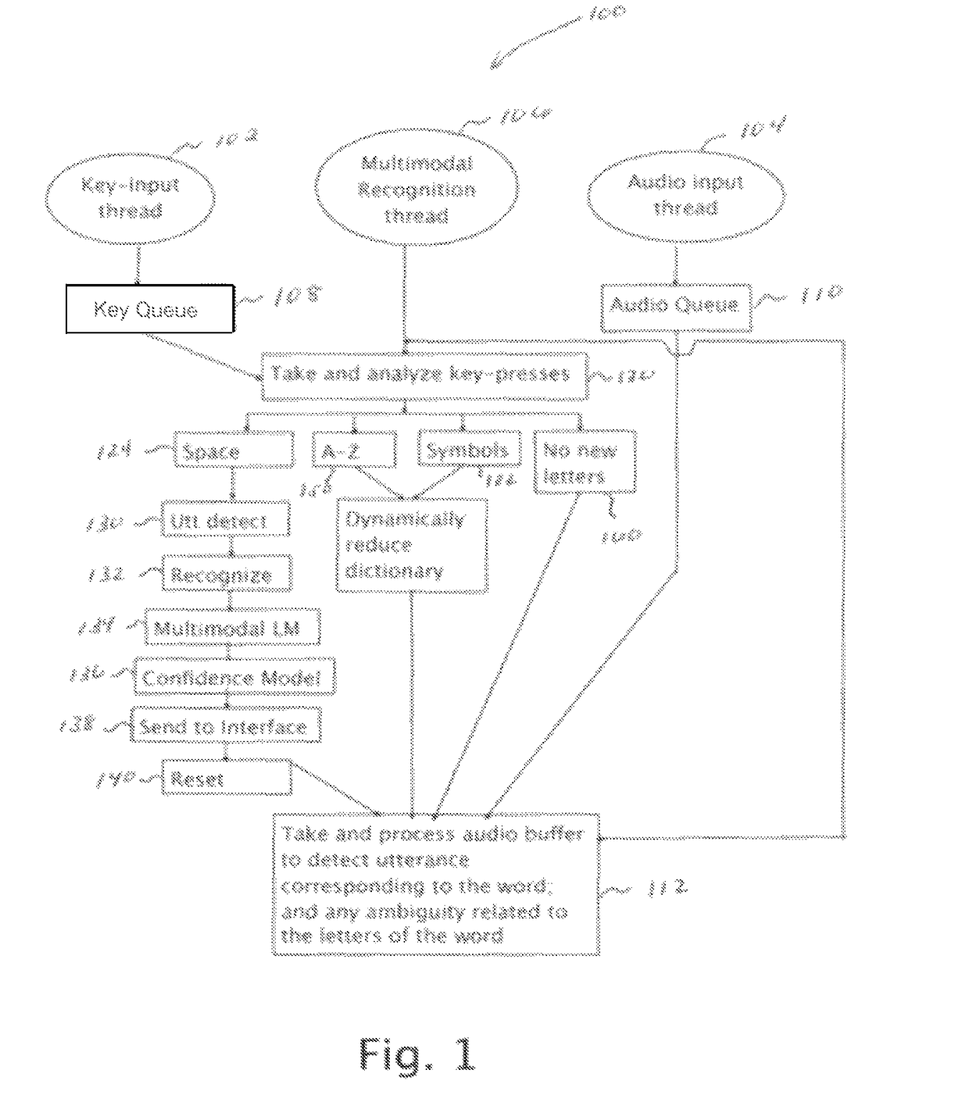
FIG. 1 illustrates one embodiment of the speak and touch auto correction interface (STACI) process proposed in this patent application.

FIG. 1 is a conceptual overview of a process 100 of the STACI system. For ease of understanding the overview is presented in the form of software designed using object oriented methodologies such as threads. However, one will appreciate that the threads may be thought of as modules too. In FIG. 1, three threads are illustrated in the system: 1) a key-input thread 102 for a keyboard interface for inputting letters; 2) an audio input thread 104 for a microphone interface for collecting audio buffers; and 3) a multimodal recognition thread 106 for implementing a multimodal speech recognition logic of STACI. The way the overall interface works in one embodiment is as follows. When a user presses keys on a keyboard, the corresponding letters or symbols or control signals are collected by the key-input thread 102 into a key queue 108. In parallel, the user could also speak a word; the microphone is open all the time and the audio-input thread 104 is collecting audio buffers into an audio queue 110. The multimodal recognition thread 106 is continuously running in a synchronized fashion as shown in FIG. 1 (as shown with reference to an arrow that connects block 112 back to block 106) to check for the letters in the key queue 108 and the audio buffers in the audio queue 110.

The multimodal recognition thread 106 first checks if there is any letter that has not yet been processed from the key queue 108. If there is no letter, i.e block 160 is reached, then it takes the audio buffer present in the audio queue 110 and passes it to the process and detect audio module 112. If in the recognition thread 106, the take and analyze key presses module 120 finds a new letter which corresponds to an alphabet set, i.e., block 150, it dynamically reduces the speech recognition active vocabulary using a method described in FIG. 2. On the other hand if the letter corresponds to a symbol (i.e., block 122), the system activates a symbol vocabulary in the recognition module 132. Finally, if the process 100 determines that the letter is an end of word indicator 124 (e.g., a space-bar), then the thread 106 carries out the following steps: (a) continues to collect any remaining audio buffers; (b) gets an utterance detected segment from an utterance detector module 130 which in turn gets this by processing the output of process and detect module 112; (c) performs speech recognition on the utterance detected in block 132 (d) finds the best word along with the NBest choices and the acoustic scores which is also part of the speech recognition process of block 132, (e) applies the multimodal language model 134 to find the final word and scores, (f) computes a recognition confidence score at block 136, (g) presents the final word along with the scores and confidence to the user interface at block 138, and (h) finally resets, at block 140, the audio queue, the key queue, the recognition searches and other necessary modules.

Figure 2:
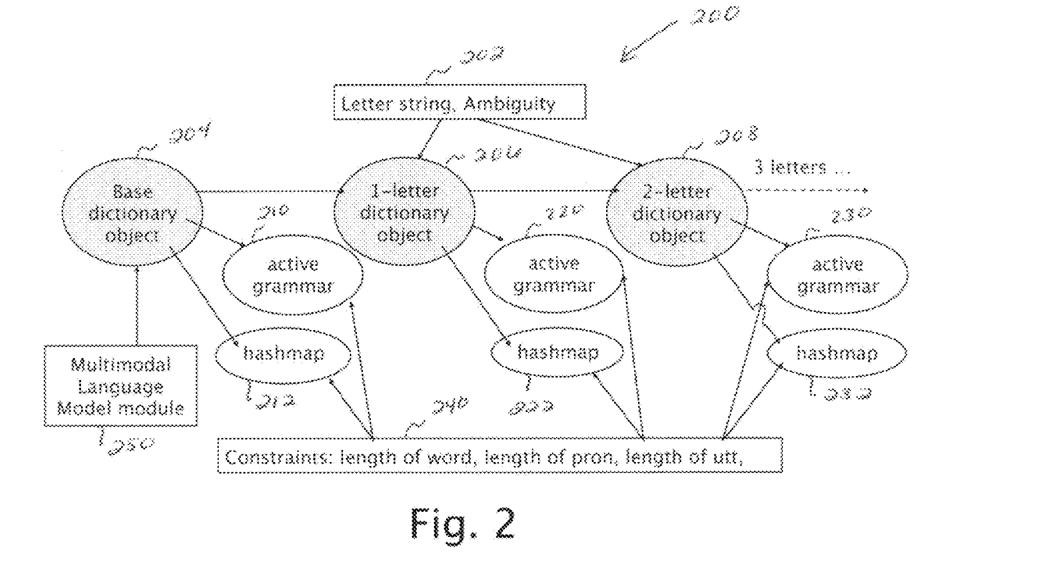
FIG. 2 illustrates one embodiment of a method for dynamically reducing the active dictionary, which forms a part of the STACI process.

In the above STACI process, if the user has typed no letters at all indicated end of word (e.g. user presses space, says awesome, then presses space again without typing any letters) then the process backs off to using the base vocabulary of FIG. 2 module 204; which may be reduced using the multimodal language model (module 250 of FIG. 2) and zero or more applicable constraints (module 240 of FIG. 2); the speech recognition is then performed just like described before. Further on, if the user does not indicate an end of word, then the utterance detector module 112 may be used to signal the end of word automatically; rest of the process remaining the same. Those skilled in art will appreciate that several different architectures, both software and hardware, may be employed to alternatively implement the concept underlying STACI.

The STACI process 100 can be easily extended to handle gesture based typing. This is described next. There are two ways of implementing this extension. One straightforward way is the following. As the user swipes or traces the letters of a word, the corresponding letters and their ambiguous parts are put by the key-input thread 102 into the key queue 108. As before, in parallel, the user may also speak a word and have the speech collected into the audio queue 110. As before, the multimodal recognition thread 106 is continuously running in a synchronized fashion, checking for the letters in the key queue 108 and audio buffers in the audio queue 110. The remaining process remains the same as described above.

Another approach to extend the STACI process 100 for gesture based typing is the following. The key queue 108 waits till the user lifts their finger indicating the end of swiping. For example, to enter the word "demonstration" the user swipes over the letters d e m s (introducing ambiguity due to swiping and also due to sloppy swiping) while speaking "demonstration" and lifting finger. Upon lifting their finger, the key-input thread 102 puts the letters with the ambiguous counterparts into the key queue 108. The STACI process 100 then processes these letters in 150 to dynamically reduce the speech recognition vocabulary in 152 and directly calls the "Get Utt Detect" 130 followed by the recognition module 132. Thus, the entire procedure is very similar except for (a) multiple letters are collected when user lifts finger and (b) end of word indicator is not the space-bar but the action by user of "lifting finger".

An example that compares STACI to other input methods is now presented for further ease of understanding. Consider the user is attempting to type the word "awesome". The following are ways to enter the word using the different input methods: (a) STACI: while typing a q e the use says "awesome" and hits space (b) STACI with gesture typing: while swiping a→q→e the user says "awesome" and stops swiping (c) QWERTY keyboard with auto correction: user types a q e some and hits space (d) Text prediction: user types a q e then lifts head to select awesome (if present) from choices displayed and then finalizes it by touching same or hitting space.

FIG. 2 describes a method 200 to dynamically reduce the recognition vocabulary. The method 200 includes a base dictionary object 204, which may be accomplished by loading a base vocabulary when the application starts for the first time, such as by reading from a file (or any other memory location). The base vocabulary and/or the base dictionary object 204 includes a list of words along with their pronunciations, statistical language model counts, and user adapted language model counts. Further, the base vocabulary and/or the base dictionary object 204 is sorted based on the words language model counts; in the event that words have the same count then metrics including length of pronunciation, length of word, the number of times the word appears as an n-gram etc are used to continue sorting.

During processing, when a letter is received from the key queue that corresponds to an alphabet, then the base dictionary object 204 is used to create the 1-letter dictionary object 206. Specifically, this is achieved by applying the letter and its ambiguity filter of block 202 to the words. As an example, if the letter typed is "A" then the letter filter is "A" and the ambiguity filter may be "QWASZX" which are the letter keys surrounding the letter key A on a qwerty keyboard; filter implies selecting only those words that begin with the letter filter or the ambiguity filter. When the second letter of the word is received, then the 1-letter dictionary object 206 is used to create the 2-letter dictionary object 208. This process is repeated until the end of word signal or the space-bar is received in which case everything is reset to simply retain the base dictionary object state 204. In each stage, the objects are further used to create the actual active grammars (e.g., 210, 220, 230) and the language model hashmaps (e.g., 212, 222, 232), using a series of constraints 240 such as length of word, length of pronunciation of the word, length of the audio corresponding to the detected utterance, and max # words. The grammars i.e. 210, 220, 230 are used by the speech recognition module of FIG. 1 block 132 to carry out recognition and the language model hashmaps i.e. 212, 222, 232 are used by the multimodal language module to apply n-gram statistics before finding the best word choice. The entire process beginning from creation of the 1-letter object 206 is repeated as the user types letters corresponding to the next word. It will be appreciated by those skilled in art that grammars may be replaced by statistical networks, pre-compiled grammars, modifications to the search algorithm in a speech recognition decoder. Similarly language model hashmaps may be replaced by other mechanisms to look up language statistics.

Figure 3:
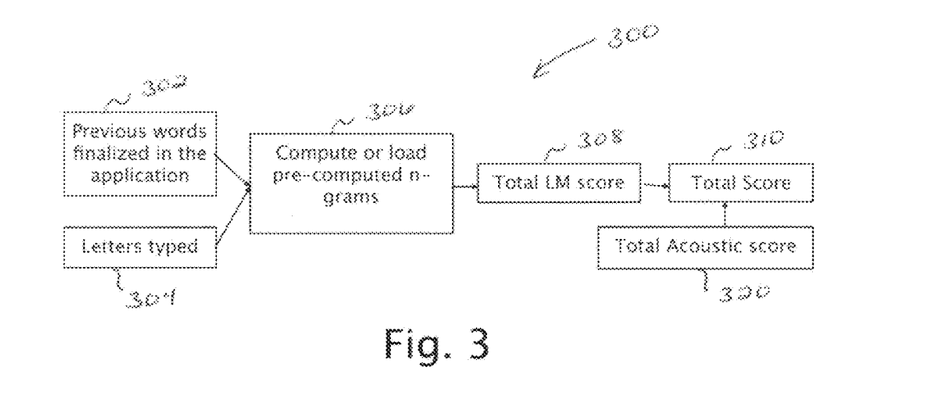
FIG. 3 illustrates one embodiment of a method for implementing a multimodal n-gram language model, used by the STACI process.

FIG. 3 describes a multimodal language model 300. Observe that instead of the standard n-gram language model used in speech recognition wherein the probability of words are computed given the previous spoken words, the proposed invention computes the probability of words given the previously finalized word by the user. The advantage of doing so is that the system knows with certainty the previous words. As an example, lets us say a user is intending to type the phrase, "this is demonstration of multimodal language model". Using conventional speech to text, the user can speak the whole phrase at once. Let's assume the conventional speech to text system recognizes "This is demonstration of" correctly but fails to recognize "multimodal" and recognizes "multiple mode" instead. This error will now propagate to the recognition of the word "language model" because its using "multiple mode" as the previous words when in reality "multimodal" is the previous word. The proposed invention does not exhibit this problem because its interface is based on a word-by-word interaction where each word is indicated as the final word using an end of word signal such as a space-bar. It can be seen from FIG. 3 that the previously finalized words 302 along with the letters entered 304 are used to compute statistical n-grams in 306. For example, if the user has typed "This de" then "This" is part of 302 and the letters "de" are part of 304 and they are used to compute bigram scores or load pre-computed bigram scores of all words starting with "de" that have "This" as the precursor word in their bigram pair. The ngram score is then added to the word's unigram and other counts like the user counts or topic counts to compute a total LM score in 308. Finally, this is combined with the acoustic scores in 320 (which are outputted by the recognition module of FIG. 1 block 132) to yield a total score 310.

Figure 4:
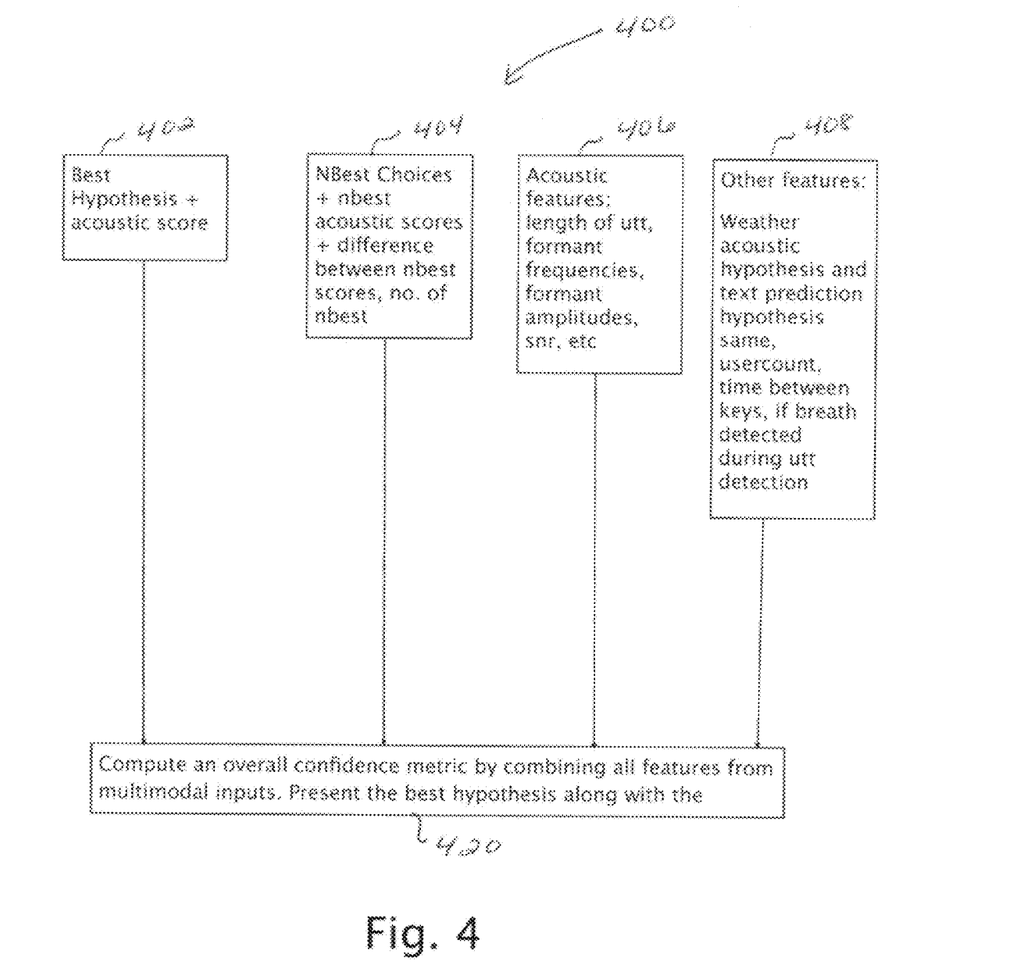
FIG. 4 illustrates one embodiment of a multimodal confidence model, also used as a part of the STACI process.

FIG. 4 describes a multimodal confidence model process 400 used in the proposed invention. Observe that the overall confidence score is computed by combining traditional confidence metrics known in speech recognition (difference between NBest scores, number of active hmm nodes, acoustic features like formant location, average frequency, signal to noise ratio etc) with multimodal features including (a) a metric that determines the closeness between acoustic only recognition and text only prediction for e.g. whether the same words were recognized by speech recognition and text prediction (b) the user language model score (c) the time between key presses and so on. As shown in FIG. 4, the best hypothesis along with its score from 402, the nbest choices along with their scores and their difference scores and the total number from 404, and acoustic features like utterance length and formant frequency locations and formant amplitudes etc from 406 are coupled by block 420 with multimodal features in 408 including whether text prediction and acoustic hypothesis are the same and user count for words and time elapsed between keys during typing the word and whether breath or other sounds detected during audio utterance detection of FIG. 1 block 114. Block 420 computes a final confidence score by sorting the scores for all hypothesis and presents it along with its corresponding best hypothesis to the user interface or application.

Certain of the components described above may be implemented using general computing devices or mobile computing devices. To avoid confusion, the following discussion provides an overview of one implementation of such a general computing device that may be used to embody one or more components of the system described above.

Figure 5:
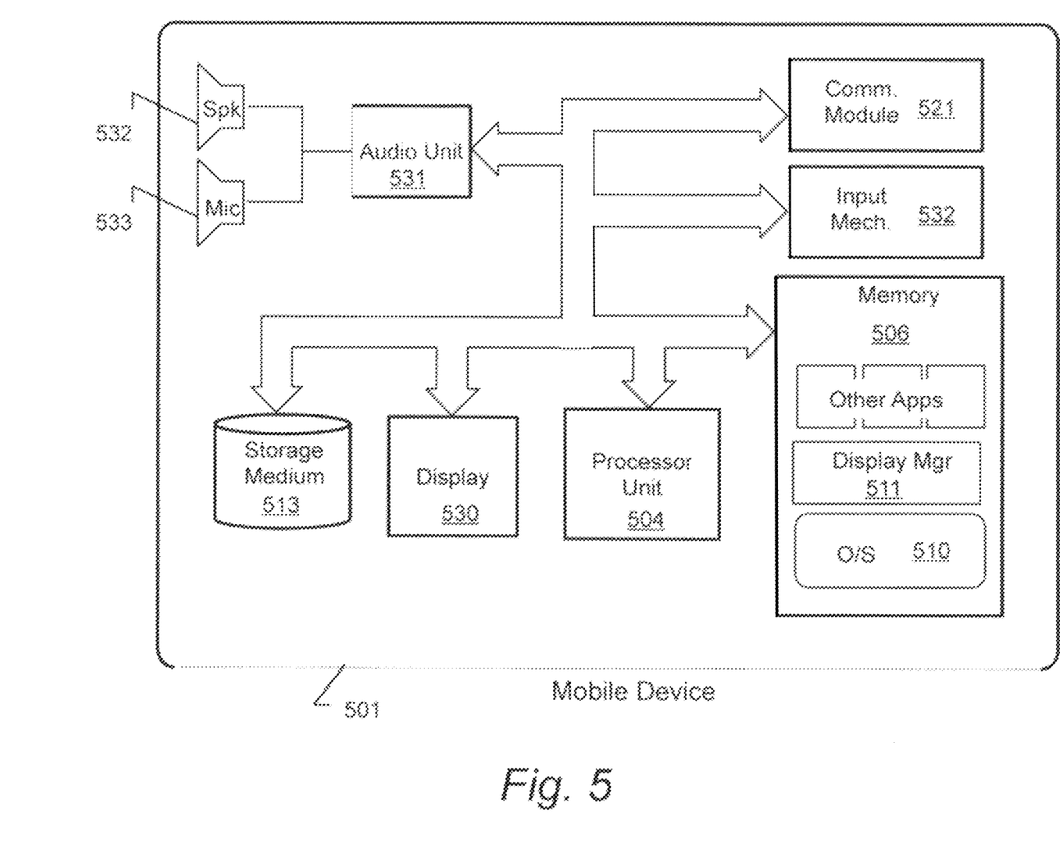
FIG. 5 is a block diagram representing a computing device in the form of mobile device with which embodiments of the present speak and touch auto correction interface process may be implemented.

FIG. 5 is a functional block diagram of a sample mobile device 501 that may be configured for use in certain implementations of the disclosed embodiments or other embodiments. The mobile device 501 may be any handheld computing device and not just a cellular phone. For instance, the mobile device 501 could also be a mobile messaging device, a personal digital assistant, a portable music player, a global positioning satellite (GPS) device, or the like. Although described here in the context of a handheld mobile phone, it should be appreciated that implementations of the invention could have equal applicability in other areas, such as conventional wired telephone systems and the like.

In this example, the mobile device 501 includes a processor unit 504, a memory 506, a storage medium 513, an audio unit 531, an input mechanism 532, and a display 530. The processor unit 504 advantageously includes a microprocessor or a special-purpose processor such as a digital signal processor (DSP), but may in the alternative be any conventional form of processor, controller, microcontroller, state machine, or the like.

The processor unit 504 is coupled to the memory 506, which is advantageously implemented as RAM memory holding software instructions that are executed by the processor unit 504. In this embodiment, the software instructions (e.g., computer-readable instructions) stored in the memory 506 include a display manager 911, a runtime environment or operating system 510, and one or more other applications or modules 512. For example, modules 512 may include a key-input module, a multimodal recognition module, an audio input module, and the like. The memory 506 may be on-board RAM, or the processor unit 504 and the memory 506 could collectively reside in an ASIC. In an alternate embodiment, the memory 906 could be composed of firmware or flash memory.

The storage medium 513 may be implemented as any nonvolatile memory, such as ROM memory, flash memory, or a magnetic disk drive, just to name a few. The storage medium 513 could also be implemented as a combination of those or other technologies, such as a magnetic disk drive with cache (RAM) memory, or the like. In this particular embodiment, the storage medium 513 is used to store data during periods when the mobile device 501 is powered off or without power. The storage medium 513 could be used to store contact information, images, call announcements such as ringtones, and the like.

The mobile device 501 also includes a communications module 521 that enables bi-directional communication between the mobile device 501 and one or more other computing devices. The communications module 521 may include components to enable RF or other wireless communications, such as a cellular telephone network, Bluetooth connection, wireless local area network, or perhaps a wireless wide area network. Alternatively, the communications module 521 may include components to enable land line or hard wired network communications, such as an Ethernet connection, RJ-11 connection, universal serial bus connection, IEEE 1394 (Firewire) connection, or the like. These are intended as non-exhaustive lists and many other alternatives are possible.

The audio unit 531 is a component of the mobile device 501 that is configured to convert signals between analog and digital format. The audio unit 531 is used by the mobile device 501 to output sound using a speaker 532 and to receive input signals from a microphone 533. The speaker 532 could also be used to announce incoming calls.

A display 530 is used to output data or information in a graphical form. The display could be any form of display technology, such as LCD, LED, OLED, or the like. The input mechanism 532 may be any keypad-style input mechanism. Alternatively, the input mechanism 532 could be incorporated with the display 530, such as the case with a touch-sensitive display device. Other alternatives too numerous to mention are also possible.

Those skilled in the art will appreciate that the proposed invention may be applied to any application requiring text-input, including (but not limited to) mobile text-messaging (SMS, MMS, Email, Instant Messaging), mobile search, mobile music download, mobile calendar/task entry, mobile navigation, and similar applications on other machines like the Personal Digital Assistants, PCs, Laptops, Automobile-Telematics systems, Accessible Technology systems etc. Additionally, several implementations of the system including a client-only, a server-only, and client-server architecture may be employed for realizing the system.

The claimed invention is:

1. A speak and touch auto correction interface, comprising:
    a key-input module configured to collect one or more key inputs entered by a user using a hardware input mechanism associated with a device, wherein a key input is associated with one of a plurality of classification types and wherein one classification type includes an end of utterance indicator that is not a letter;
    an audio-input module configured to collect, in parallel with the key inputs, one or more speech samples spoken by the user using a hardware audio unit associated with the device;
    a multimodal module that dynamically reduces a vocabulary as key inputs are entered, but waits for performing speech recognition until the end of word indicator is entered, the vocabulary is dynamically reduced based on the key inputs and on the classification type associated with the key inputs, and, upon receiving the end of word indicator, the multimodal module obtains and stores the key inputs and an utterance detected segment from the one or more speech samples, wherein the utterance detected segment comprises speech samples spoken by the user corresponding to the word, and performs speech recognition when the end of word indicator is received on the utterance detected segment using a current state of the dynamically reduced vocabulary, wherein if the key inputs includes at least one letter, the multimodal module applies an ambiguity filter when dynamically reducing the vocabulary, the ambiguity filter reflecting ambiguities caused by one or more potential typing errors, and wherein if the key inputs includes a symbol, the multimodal module dynamically activates an associated vocabulary associated with the symbol, the associated vocabulary becomes the vocabulary that undergoes dynamic reduction, the symbol is not letters and is not the end of word indicator.

2. The speak and touch auto correction interface of claim 1, wherein the at least one letter includes one letter and the one letter is applied as a filter on entries on the vocabulary thereby reducing the vocabulary.

3. The speak and touch auto correction interface of claim 1, wherein the at least one letter includes a letter string and the letter string is applied as a filter on entries on the vocabulary thereby reducing the vocabulary.

4. The speak and touch auto correction interface of claim 1, wherein dynamically reducing the vocabulary includes applying constraints on entries within the vocabulary to reduce the vocabulary.

5. The speak and touch auto correction interface of claim 1, wherein dynamically reducing the vocabulary further comprises applying a multimodal language model to further filter entries in the vocabulary.

6. The speak and touch auto correction interface of claim 1, wherein the vocabulary includes a dictionary having words and corresponding pronunciations.

7. The speak and touch auto correction interface of claim 1, wherein the multimodal module further identifies a best choice along with a plurality of alternative best choices.

8. The speak and touch auto correction interface of claim 7, wherein the multimodal module further determines a recognition score calculated using an acoustic score and a multimodal language model score for the best choice and the plurality of alternative best choices.

9. A computing device configured to provide a multimodal interface for entering input, the computing device comprising:
- a hardware input mechanism;
- a hardware audio unit;
- a computer storage medium storing computer-readable components comprising computer-readable instructions:
- a processor configured to execute the computer-readable instructions, the computer-readable components comprising:
- a key-input module configured to collect one or more key inputs entered by a user using the hardware input mechanism;
- an audio-input module configured to collect, in parallel with the key inputs, one or more speech samples spoken by the user using the hardware audio unit;
- a multimodal module that dynamically reduces a vocabulary as key inputs are entered, but waits for performing speech recognition until an end of utterance indicator is entered, the vocabulary is dynamically reduced based on the key inputs and on a classification type associated with the key inputs, wherein one classification type includes the end of word indicator that is not a letter, and, upon receiving the end of word indicator, obtains and stores the key inputs and an utterance detected segment from the one or more speech samples, wherein the utterance detected segment comprises speech samples spoken by the user corresponding to the word, and performs speech recognition when the end of word indicator is received on the utterance detected segment using a current state of the dynamically reduced vocabulary.

10. The computing device of claim 9, wherein if the key inputs includes at least one letter, the multimodal module applies an ambiguity filter when dynamically reducing the vocabulary, the ambiguity filter reflecting ambiguities caused by one or more potential typing errors.

11. The computing device of claim 10, wherein the at least one letter includes one letter and the one letter is applied as a filter on entries on the vocabulary thereby reducing the vocabulary.

12. The computing device of claim 10, where the key inputs includes a letter string and the letter string is applied as a filter on entries on the vocabulary thereby reducing the vocabulary.

13. The computing device of claim 10, wherein dynamically reducing the vocabulary includes applying constraints on entries within the vocabulary to reduce the vocabulary.

14. The computing device of claim 10, wherein dynamically reducing the vocabulary further comprises applying a multimodal language model to further filter entries in the vocabulary.

15. The computing device of claim 10, wherein the vocabulary includes a dictionary having words and corresponding pronunciations.

16. The computing device of claim 9, wherein if the classification type for the key inputs includes an object, a vocabulary associated with the object is dynamically activated as the vocabulary.

17. The computing device of claim 9, wherein the multimodal module further identifies a best choice along with a plurality of alternative best choices.

18. The computing device of claim 17, wherein the multimodal module further determines a recognition score calculated using an acoustic score and a multimodal language model score for the best choice and the plurality of alternative best choices.

19. The speak and touch auto correction interface of claim 1, wherein the end of word indicator is entered by the user after speaking an utterance corresponding to the word.

20. The speak and touch auto correction interface of claim 1, wherein the end of word indicator is entered by the user prior to the user finishing speaking an utterance corresponding to the word.

21. The computing device of claim 9, wherein the end of word indicator is entered by the user after speaking an utterance corresponding to the word.

22. The computing device of claim 9, wherein the end of word indicator is entered by the user prior to the user finishing speaking an utterance corresponding to the word.

* * * * *